Oct. 29, 1968     S. R. R. BLOM     3,407,457
PLANT FOR THE MANUFACTURE OF AERATED CONCRETE
Filed March 14, 1966     4 Sheets-Sheet 1
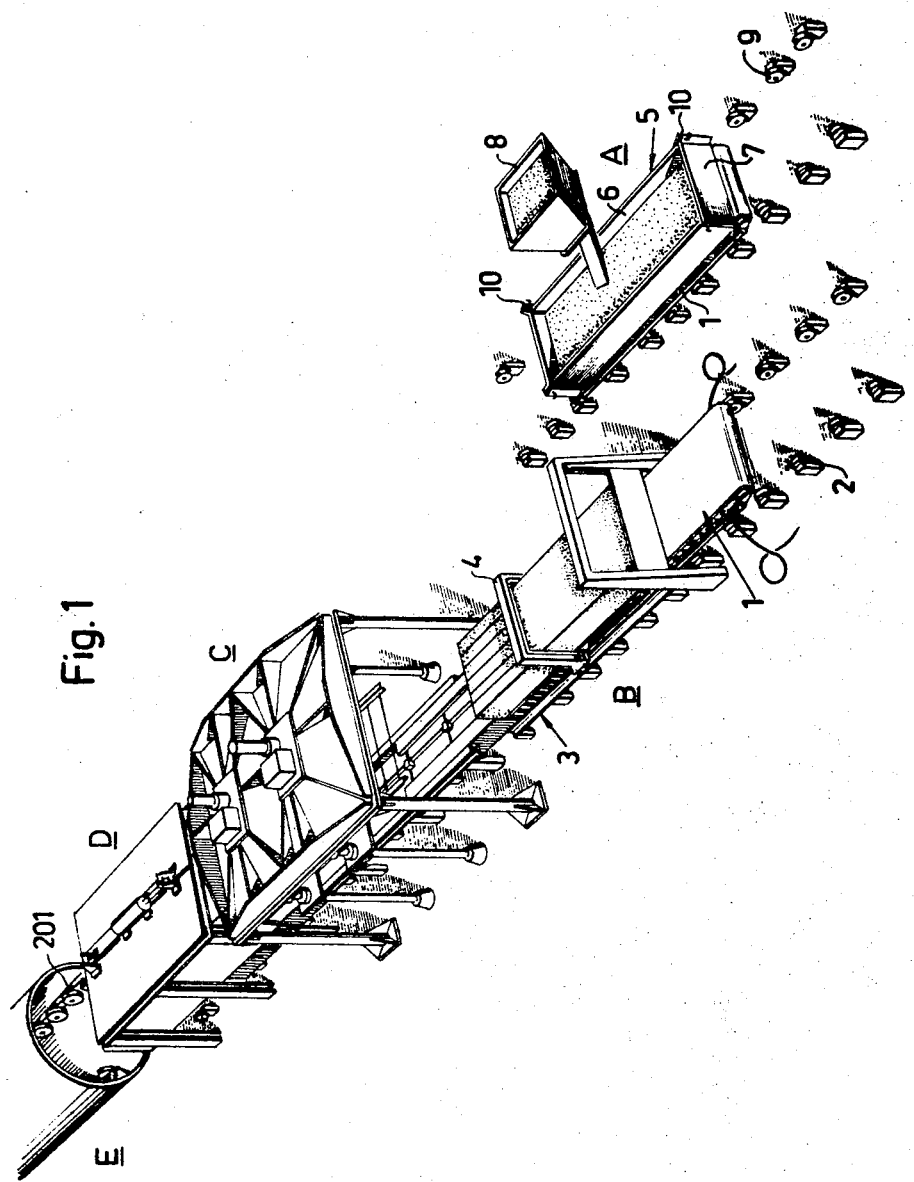
Inventor
Sven Rune Roland Blom
By Pierce, Scheffler & Parker
Attorney

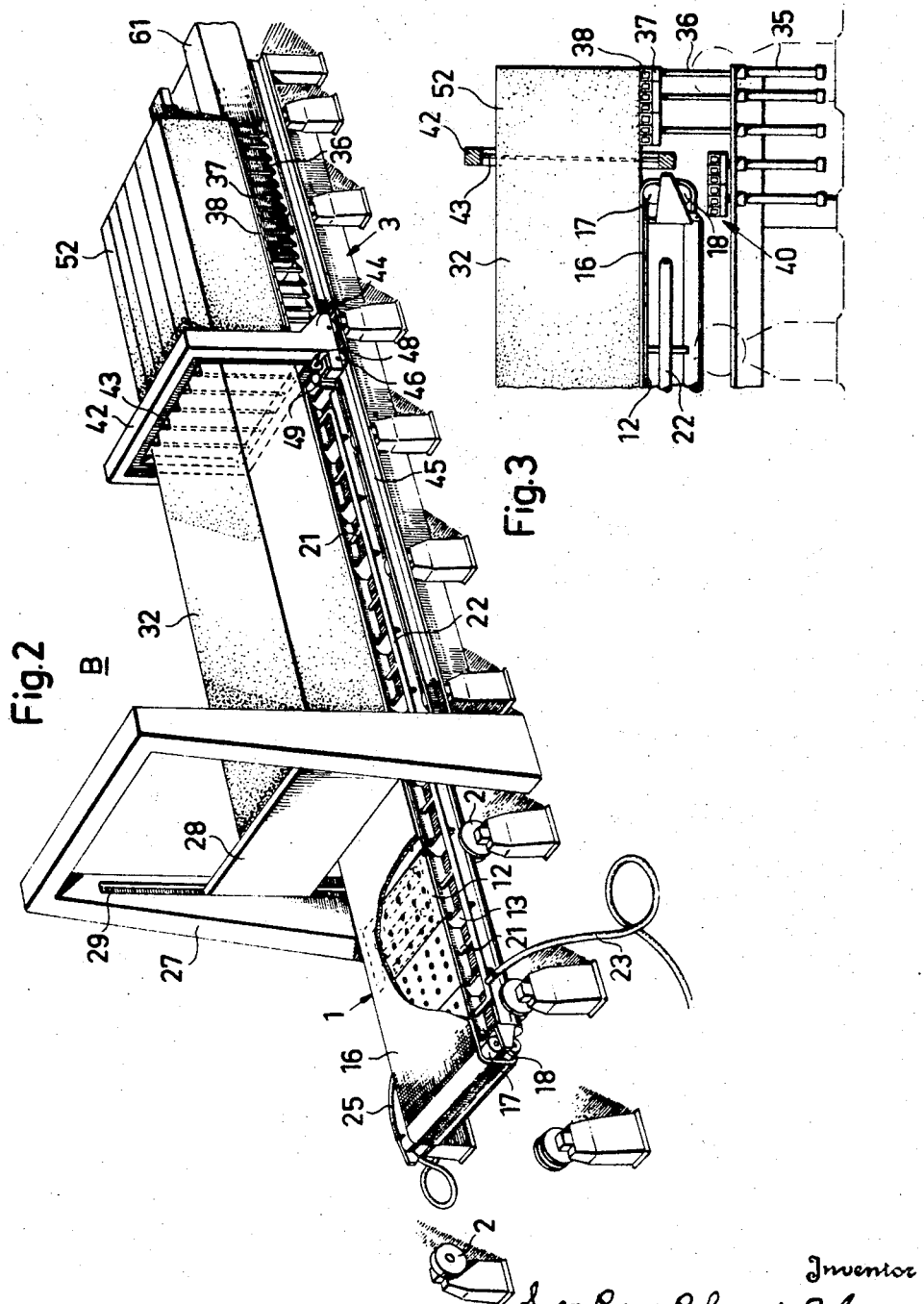

Oct. 29, 1968     S. R. R. BLOM     3,407,457
PLANT FOR THE MANUFACTURE OF AERATED CONCRETE
Filed March 14, 1966     4 Sheets-Sheet 3
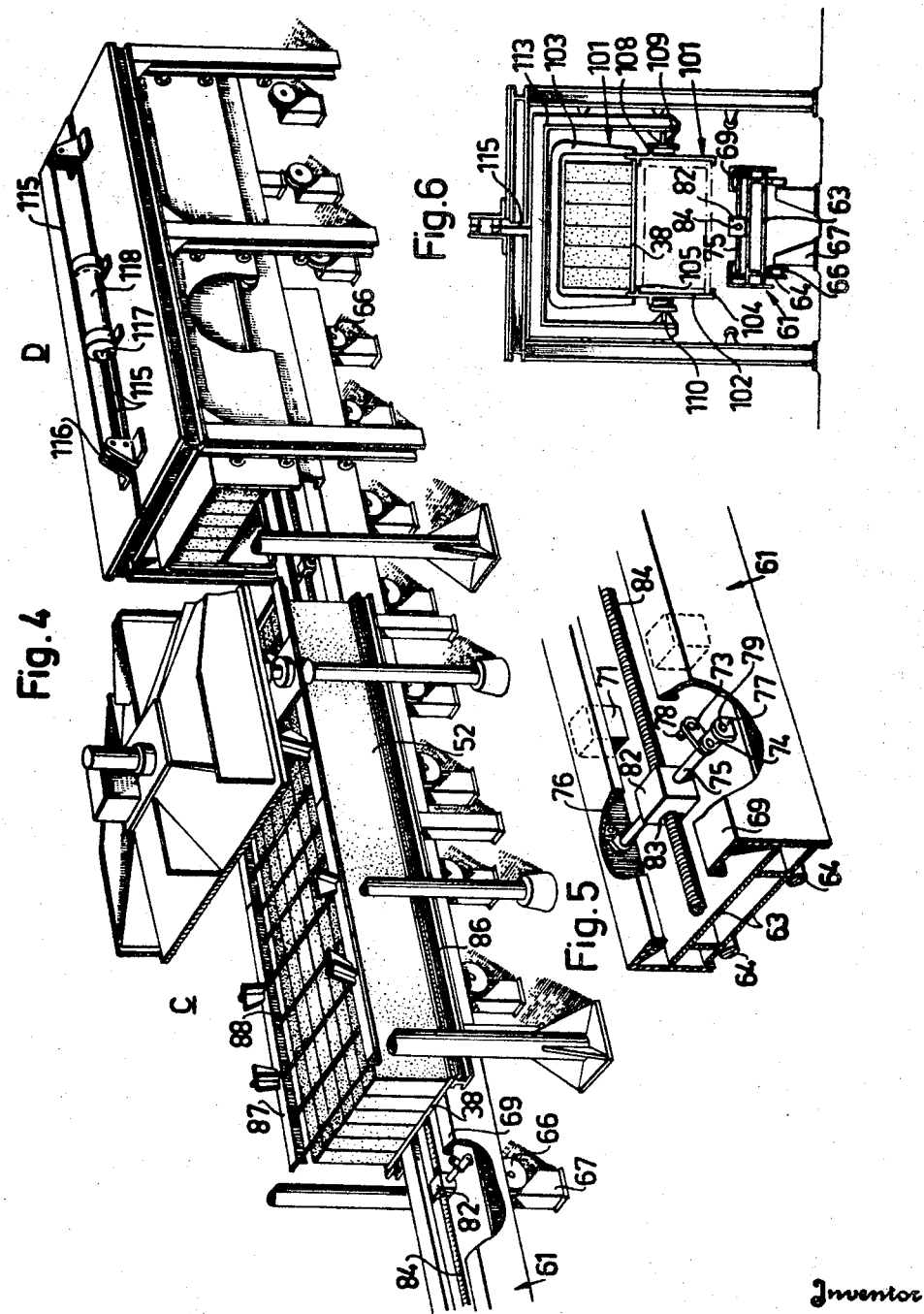
Inventor
Sven Rune Roland Blom
By Pierce, Scheffler & Parker
Attorney

United States Patent Office 3,407,457
Patented Oct. 29, 1968

3,407,457
PLANT FOR THE MANUFACTURE OF
AERATED CONCRETE
Sven Rune Roland Blom, Skovde, Sweden, assignor to
Durox International S.A., Luxembourg, Luxembourg,
a company of Sweden
Filed Mar. 14, 1966, Ser. No. 533,957
Claims priority, application Sweden, Mar. 19, 1965,
3,595/65, 3,596/65
13 Claims. (Cl. 25—2)

ABSTRACT OF THE DISCLOSURE

In making building blocks of aerated concrete, damage to the freshly formed and still unhardened blocks is minimized by providing a plurality of mutually parallel, vertically movable, block-carrying sections to receive blocks as subdivided and to support the same throughout the subsequent steps including the hardening procedure.

---

This invention relates to the manufacture of building blocks, including large blocks usually referred to as building elements, from semi-plastic, unhardened, yet relatively shape resistant bodies having poor mechanical strength. More particularly the invention relates to the manufacture of aerated or porous concrete, often referred to as light weight or gas concrete, from a slurry of silicious matter, hydraulic binders and gas forming substances, such as aluminium powder, which slurry is poured into a mould where it rises or swells, due to the development of gas, and sets to form an unhardened slab or body. The mould has a bottom and usually vertical walls removable from the bottom. The slab or body has usually to be subdivided into smaller blocks, even often of considerable size, such as about 6 m. long and 0.6 m. high. The slab is usually subdivided in its length direction by means of cutting threads stretched between upper and lower bars of a substantially vertically positioned and reciprocable frame while it is passed from a delivery support over a gap occupied by the cutting frame onto a receiving support. Such supports are known to comprise endless conveyor belts, sometimes in the form of separate interlinked sections but usually in the form of metallic belts, such as steel belts, supported by many tightly spaced rollers of small diameters. The cut blocks are transferred to a truck or the like, which is conveyed to an autoclave where the blocks are cured, for instance, at about 200° C. for about 15–18 hours.

From this description it will be obvious that the relatively brittle blocks may be seriously damaged by all the handling they are subjected to. The blocks frequently obtain smaller and greater cracks, particularly at the bottom region, which seems to be formed not only when the blocks are transferred from one support or carrier to another but very often also when moved on the support or the like as on a conventional conveyor belt. This is believed to be the result of stretching or bending forces occuring in the bottom surface layers, which may be due to irregular movements of the support sections relative to each other in belts composed of such sections, or to the uneven support surface rendered by the many rollers supporting a plane conveyor belt of steel or the like, which must be comparatively thin so that it can be easily bent over rollers at the ends of the support.

It is an object of the invention to provide means for transporting the slabs and blocks in the manufacture referred to form one station of operation to another conveniently and with a minimum of damaging, and it is also an object to obtain this with relatively simple means and in large commercial scale and in a continuous or semicontinuous manner. Another object is to provide a carrier for blocks to be cured in an autoclave of circular cross-section so as to effectively utilize the space of the autoclave and fill up the space with blocks to a very great extent, and a further object is to minimize the need of heat for the ineffective heating of the carrier itself.

For obtaining these objects and further advantages a plant of the invention, in the first hand, comprises a plurality of mutually parallel carrying sections arranged transversally to the direction of transfer of said slab and blocks and vertically movable, independently from one another, from a lower inactive position to a definite upper carrying position where the assembly of sections form a horizontal plane support for said blocks in alignment with said delivery support, said supports being horizontally movable in said transfer direction relative to one another with said delivery support at a level above that portion of the receiving support where said carrying sections are in their inactive positions, said means for transferring the slab comprising a pushing member adapted to engage said slab and being horizontally immovable relative to the receiving support, a jack member for lifting each of said carrying sections from its inactive to its carrying position as soon as no part of the delivery support and the cutting member overlies it.

In order that the undivided block shall move safely and avoid damaging on the delivery support the latter may comprise a table, a conveyor belt adapted to be moved slidingly on top of said table in the transfer direction, a source of pressure medium, and means for controllably communicating said source through said table with the top surface thereof, so as to provide a friction reducing layer of pressure medium between the table and the conveyor belt. The pressure medium may be a gas, usually air, or a liquid, usually oil or water, or both supplied alternatingly or simultaneously, preferably independently.

It is preferred to use a liquid, particularly oil, because it forms a fairly resistant film between the belt and the table. The liquid should be injected at a pressure at least 10% higher than the pressure exerted by the concrete block on the support. In the case of a 60 cm. high block the liquid pressure should amount to 40–60 mm. Hg. Initially, before the friction at rest between the belt and the table will have been vanquished, the liquid pressure should be higher, preferably about 5 times the above mentioned value. The liquid, such as oil, bleeds out between the belt and the table. This loss of oil can be reduced if oil and air are used alternatingly as pressure medium, for instance by injecting oil for 10 seconds, then air for 1 minute, and then again oil etc.

The impervious belt is suitably made of thin metal sheet, e.g. of steel or aluminium. Alternatively it may consist of, for instance, an India-rubber mat, a plastic foil or a fabric reinforced plastic. The table and the sheet suitably form the bottom of the mould. After removing the walls of the mould the block is moved on the support as described.

The location of the openings in the table does not seem to be critical, because the pressure medium seems to distribute evenly between the sheet and the support. For a small support one opening at the centre of the support is sufficient. For a greater support it may, for instance, be adequate to arrange openings with a diameter of 3 mm. at a mutual distance of 1 m. The openings may have the form of slits, for instance a slit centrally of the support substantially along its entire length. Usually the table is evenly perforated with holes about a decimeter apart.

The problem of careful handling in the receiving support is solved by using carrying sections of limited extension in the transport direction, which are vertically movable by lifting means, jack members. These are preferably actuated hydraulically, as by pressure oil, warranting an even and exact motion. Advantageously the carrying section, is slightly movable horizontally, particularly in the transport direction, whereby local stresses in the bottom layers of the block are eliminated. If the jack member includes piston rods supporting the carrying section, the elasticity of the rods is usually sufficient to render this movability. Alternatively the carrying section may be loosely supported by a carrying plate.

The receiving support also comprises means for transporting the cut block further. In a preferred embodiment it comprises an accessory or intermediary rigid carriage which includes a carrying beam at each longitudinal half of the receiving support and is movable longitudinally along the assembly of said jack members, each of said beams, when advanced to a position below said carrying sections raised to their carrying positions, being adapted to engage the overlying portions of all said sections, and means for vertical displacement of said beams relative to said sections so as to bring said beams to carry the assembly of sections, at least when said jack members are inactivated. There should also be a track for said carriage arranged longitudinally of the assembly of jack members and extending further outside of said assembly in the transfer direction of the blocks, a set of rollers cooperating with said carriage and track to facilitate the movement of the carriage along said track. The carriage may have wheels running on rails, or there may be rails mounted on the carriage and adapted to travel on rows of rollers. By the aid of the carriage the cut blocks can be transported to another station, e.g. a cross cutting station, a reloading station, or even directly to the autoclave.

According to one of its aspects the invention comprises a carrier for transporting semi-plastic unhardened blocks to be cured in a heating device of the class including an autoclave, suitable for the plant described above. The carrier comprises two substantially vertical side walls, at least one yoke member rigidly connecting the upper edges of said walls to form a rigid carrier structure, longitudinal horizontal strips on the inner sides of said walls near the lower edges of the walls and at an intermediate level of said carrier structure adapted to carry a support member consisting of a plurality of parallel transversal carrying sections, and on the outer side of each of said walls a rolling transport member close to the wall. The rolling transport member may comprise a bar rigidly secured to the wall cooperating with rollers fitted in said heating device, some of which rollers being, if desired, driven, or alternatively a bar rigidly secured to the wall and rollers rotatably mounted on said bar and adapted to cooperate with tracks in said heating device. The rollers should be fitted near the side wall so as to avoid torque stresses in the side wall which is loaded only on the strips near its inside surface.

In the carrier, in one embodiment of the invention, at least one of said yoke members is provided with a suspending member adapted to engage a lifting device, enabling the carrier to be positioned with its upper or lower strips in level with the carriage from which the carrier shall take over the cut blocks resting on the assembly of carrying sections. The suspending member may be cooperating with a transport line in the ceiling or otherwise mounted overhead.

The invention will now be described more in detail with reference to a non-limiting embodiment illustrated on the drawings, in which:

FIG. 1 is a perspective total view of a plant comprising various aspects of the invention.

FIG. 2 is a perspective view of the delivery and receiving supports.

FIG. 3 is a cross sectional view of the cutting and delivery region region of the supports of FIG. 2.

FIG. 4 is a perspective view of the crosswise cutting station and the reloading station of the plant.

FIG. 5 is a perspective view on enlarged scale of a lifting device of the carriage shown in FIG. 4.

FIG. 6 is a cross sectional view of the reloading station shown in FIG. 4, and

Figure 7:
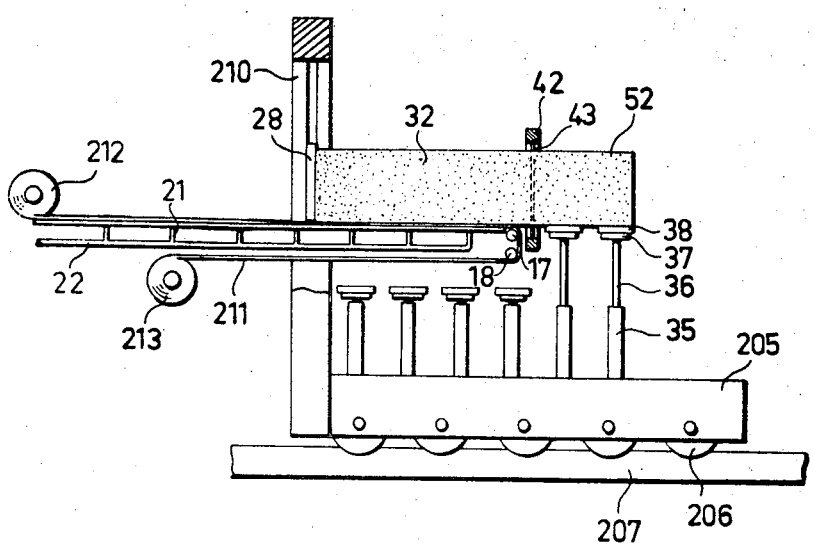
FIG. 7 is a diagrammatic cross sectional view of an alternative embodiment of the invention in which the receiving support is horizontally movable.

As will be seen from FIG. 1 the plant comprises a moulding station A, a length cutting station B, a cross cutting station C, a reloading station D, and an autoclave E. The length cutting station comprises a delivery support 1 which is horizontally movable on tracks of rollers 2, and a receiving support 3, which is stationary, and a cutting frame 4 at the front end of delivery support 1, movable therewith. At the moulding station A a mould frame 5 composed of longitudinal side walls 6 and end walls 7 is placed on top of a delivery support 1 forming a mould into which the concrete mass is poured from a hopper device 8. The mould charged with the slurry of a concrete mass will be transported on the track of rollers 9 to a place where the mould may be left for the slurry to rise in the mould and set to an unhardened block. When the rising of the slab is finished the mould frame is removed from the block by first loosening the clamping means 10 securing the side walls to the end walls at the corners of the frame. The delivery support 1 will then be transported by means not shown to the track of rollers 2 and moved into the length cutting device B which is better illustrated in FIG. 2.

The delivery support 1 comprises a table composed of a plurality of perforated plates 12 resting on transversal supports 13. A conveyor belt 16 is longitudinally movable on the table about upper and lower end rollers 17 and 18. At the under side of the plates 12 there is at least one system of channels for pressure medium communicating with a source of pressure medium over branch pipes 21, a main pipe 22 and a flexible conduit 23. Some of the perforations may communicate with a second system of channels, which communicate with another source of pressure medium through conduit 25 on the other side of the table. One of the pressure medium systems may contain oil as pressure medium and the other air. Oil and air may be supplied simultaneously or alternatingly. The consumption of oil, at least when air is also used, is very small, say one or two declitres for removing one 6 meter long block in about 6 minutes.

The delivery support 1 is moved on the track of rollers 2 in between the pillars 27, the door plate 28 being at that occasion hoisted by hydraulic means, not shown, to its upper position in flute 29, until the rear end of the unhardened concrete block 32 has passed the pillars. The door 28 is then lowered to hinder the block 32 to move backwards. During the movement of the delivery support 1 the passage is unobstructed.

The receiving support 3 comprises at each of its longitudinal sides a row of jack members which are better seen in FIG. 3. The jack members comprise hydraulic cylinders 35 in which piston rods 36 are vertically movable. A rod plate 37 is secured to the top of each rod 36 so as to act as support for three square hollow bars or rods 38, which are thus carried at their ends by cooperating jack members at each side of the receiving support. The bars 38 constitute the carrying sections which by and by take over the carrying of the cut block units 52 as they are delivered from the delivery support through the cutting frame 42.

When the delivery support 1 is moved into starting position all the jack members are in their lower positions as illustrated at 40 in FIG. 3. When the cutting operation is to start oil and/or air is supplied through the conduits 23, 25 so as to form a friction reducing layer between belt 16 and the table plates 12. The cutting device comprises a frame 42 having cutting wires or threads 43 vertically stretched between the upper and lower bars of the frame. The frame is carried by a small carriage 44 movable on a rail 45 by wheels 46. For the cutting operation the cutting frame or its carriage 44 is coupled with the support table 1 in any convenient manner, as by a pin or bolt 48 by which a plate 49 secured to the support 1 is fixed to the carriage 44. The support 1, with the cutting frame 42 attached thereto, is now moved to the left as illustrated in the drawing. The concrete block 32 is retained by the door 28 and is longitudinally subdivided by the cutting threads 43, which may be vertically vibrated by means not illustrated, to form block units 52 at the place where the block 32 leaves the conveyor belt 16 when the latter is passed over end rollers 17 and 18. The newly cut units 52 are taken by the carrying section 38 which is raised hydraulically as soon as the cutting frame has passed to the left to make the space above the section free for its elevation. The piston rods 36 have arresting means preventing them and the carrying sections 38 to be elevated over a pre-defined level. Thereby all the carrying sections 38 will form a plane table carrying the block units 52 as they are delivered from the delivery support 1. When the entire block 32 is cut, the cutting frame 42 is released from the support 1, so that the latter can be entirely removed to be used for casting another block. The block units 52 now rest entirely on carrying sections 38. By virtue of their slight elasticity the piston rods 36 will allow the carrying members 37 and 38 to move slightly in the transfer direction. Such movement may also be allowed by relative movement between the hollow bars 38 and the rod plates 37, provided the bars are loosely arranged on top of the plates.

The receiving support comprises supplementarily a carriage 61 arranged to transport the cut block units from the jack members to other stations in the plant, maybe directly to the autoclave E. However, according to one embodiment of the invention, the carriage is only an accessory means for transporting the blocks to the cross cutting device C or directly to the reloading device D.

The structure of the carriage 61 is best seen in FIGS. 4, 5 and 6. The carriage consists of a framework 63 having one rail 64 at either longitudinal side adapted to cooperate with rows of rollers 66 rotatable about pins secured in pillars 67 of the basement. The rows of rollers 66 form tracks along which the carriage can travel. Carrying beams 69 are mounted on the framework 63 and rest ordinarily on the framework via supporting blocks 71. The carrying beams 69 can be lifted relative to the framework 63 by any suitable lifting device. In the embodiment illustrated the lifting device comprises a system of elbow links, namely a plurality of pairs of links, each pair comprising an upper link 73 and a lower link 74, both pivoted about a rod 75. The outer ends of the links are pivoted in ears 76 and 77, respectively, by pins 78 and 79. The rods 75 are rigidly secured to a die block 82 provided with a threaded hole 83 so as to be longitudinally movable on a screw bar 84 carrying the die blocks 82 of the plurality of lifting links. By rotating the screw bar 84 by suitable means, not illustrated, all die blocks 82 are moved longitudinally, thereby moving the elbow so as either to increase or minimize the angle between the links 73 and 74. in the former case causing the carrying beam 69 to be lifted relative to the framework 63 and in the latter case to lower the beam.

It will be easily understood that when this carriage is moved on the rollers 66 in between the jack members, including the rod plates 37, the entire assembly of carrying sections 38 and block units 52 can be lifted from the rod plates 37 upon actuating the screw rod 84. When the carriage 61 has taken over the load it is moved to next station. At the cross cutting station C the assembly may be lowered so that the carrying sections 38 will rest upon beams 86. Cutting frames 87 provided with transversal cutting wires or threads 88 may then cause the block units 52 to be subdivided in the transversal direction in a manner known per se and in any desired length.

The carriage shown in the drawing is long enough to comprise two of the stations so that one assembly of carrying sections 38 of the receiving support 3 is lifted simultaneously with one assembly having been cut in the cross cutting station C. It is possible, of course, to use separate carriages. When the carriage moves to the right as illustrated in the drawing the newly cut block units 52 are transferred to the cross cutting station while those cut in that station are transferred to the reloading station D. When the blocks and the carrying sections 38 have been taken over by the reloading device D and the assembly in the cross cutting device C rests on the beams 86 the carriage 61 is empty and moved back to the receiving support of the cutting device C.

The reloading device D comprises a carrier structure 101 consisting of two vertical parallel side walls 102, usually having a length much greater than the height. At their upper edges the side walls are interconnected by means of yoke members 103 so as to form a rigid carrier structure 101. At their inner sides, the sides facing one another, the side walls have strips 104 at their bottom edges and 105 at their upper edges, projecting inwardly to form shelves for carrying an assembly of carrying sections 38. The height of the yoke 103 is about equal to the height of the side walls so that the carrier structure will contain two floors of about equal height. At their outward sides side walls 102 are provided with a bar 108 having the dual function of stabilizing the side wall and forming a rail for the structure travelling on rollers 109 rotatably mounted on pins 110 attached to a U-shaped reloading frame 113, or rollers 201 mounted in the autoclave E. The reloading frame 113 is suspended in wires 115 passing over rollers 116 mounted on the roof of the reloading device. The wires 115 are secured to a member 117 connected to a piston operating in a hydraulic cylinder 118. By these means the reloading frame 113 and the carrier structure carried thereby can be moved vertically to bring each floor to register with an assembly of carrying sections 38 carried by the carriage 61.

In the reloading operation the carrier structure 101 is lowered so that the upper strips 105 are at a level somewhat below the carrying sections 38 of a load carried by carriage 61 on the point of being pushed into the reloading device. When the carriage is inserted in the reloading device the entire assembly of sections 38 and blocks 52 pass into the upper floor of the carrier structure. When the whole assembly has been inserted the carrier is hoisted by means of the hydraulic means 118 until it attains about the position illustrated in FIG. 6. The carriage 61 is then removed to fetch another load. The carrier structure 101 is adjusted to correct position with the strips 104 slightly below the level of the carrying sections 38 of next load. In FIG. 4 the carrier is in such position. The lower floor is charged in a way similar to that described above.

When both floors are filled the reloading frame 113 is brought to the level where the rollers 109 register with the rollers 201 of the autoclave. The carrier structure 101 can now be pushed into the autoclave E, or be transported by driving means on some of the rollers in conventional manner. Driving rollers may be provided in the reloading device or in the autoclave or in both.

The general cross section of the carrying structure is about square so that the load fills out the circular cross section of the autoclave to a very great extent.

The carrier structure can be made without using much metallic material that has to be heated and cooled at each operation. If so on account of the particular design. The forces attacking the side walls by the load and the reaction forces at the support on the carrying wheels 109 attack the walls practically vertically in or very near the walls. The longitudinally extending strips 104 and 105 and bars 108 also contribute in strengthening the walls so that they can be made relatively thin. Moreover, the use of separate yokes 103 at adequate intervals renders the structure stiff and rigid with a minimum of metallic material.

After completion of the hardening in the autoclave the carrier is taken out and unloaded in any suitable manner, the carrying sections 38 being returned to the receiving support 3 for reuse.

In the embodiment described above and illustrated in FIGS. 1 and 2 the delivery support 1 is movable and the receiving support 3 is stationary. It is, of course, within the scope of the invention to make the delivery support stationary and the receiving support movable. This embodiment is diagrammatically illustrated in FIG. 7. The jack cylinder 35 with its piston rod 36 and rod plate 37 is mounted on a carriage 205 provided with wheels 206 running on rails 207. At the entrance end of carriage 205 a pair of pillars 210 is mounted for carrying the hoistable door 28 functioning principally as that referred to above. A set, unhardened block 32 is cast as above on the conveyor belt 211, which in this case is not endless but is taken from a roll 212, passed over the table and the rollers 17 and 18 at the delivery end of this delivery support and finally wound on a lower roller 213. Pressure medium is supplied to the under side of belt 211 through pipe 22 and branch pipes 21, in principle as described above. When the block 32 shall be cut the carriage 205, with the door 28 hoisted, and the jack members in lowered position, is moved in beneath the stationary delivery support until the door can be lowered behind the block 32. The cutting frame 42 at the delivery end of belt 211 is actuated and the carriage 205 moved to the right as illustrated, whereby the block 32 is pushed by the door 28 and moves, resting on the belt 211, slidingly on the stationary table. The cutting threads 43 subdivide the block 32 into block units 52 which are caught by carrying sections 38 on the jack members as the jack members come outside the delivery support and are raised to their upper positions.

I claim:

1. In a plant for the manufacture of blocks, including building elements, of aerated concrete, comprising a mould for casting and aerating a slab of set unhardened concrete, said mould having a bottom and substantially vertical walls removable from said bottom, a delivery support, a receiving support and a cutting member between said delivery and receiving supports, means for transferring a slab cast and set in said mould from said delivery support past said cutting member onto said receiving support, which thus receives longitudinally subdivided blocks, an autoclave for curing said blocks, and a carrier for transporting said blocks from said receiving support into said autoclave, the improvement wherein said receiving support comprises a plurality of mutually parallel carrying sections arranged transversely to the direction of transfer of said slab and blocks and vertically movable, independently from one another, from a lower inactive position to a definite upper carrying position where the assembly of sections forms a horizontal plane support for said blocks in alignment with said delivery support, said supports being horizontally movable in said transfer direction relative to one another with said delivery support at a level above that portion of the receiving support where said carrying sections are in their inactive positions in which they underlie the delivery support and the cutting member, said means for transferring the slab comprising a pushing member adapted to engage said slab and being horizontally immovable relative to the receiving support, and a jack member for each carrying section for lifting each said carrying section from its inactive to its carrying position as soon as no part of the delivery support and the cutting member overlies it.

2. A delivery support for a plant as claimed in claim 1, comprising a table, a conveyor belt adapted to be moved slidingly on top of said table in the transfer direction, a source of pressure medium, and means for controllably communicating said source through said table with the top surface thereof, so as to provide a friction reducing layer of pressure medium between the table and the conveyor belt.

3. A delivery support as claimed in claim 2, comprising, as source of pressure medium, a source of pressure liquid and a source of pressure gas, and means for controllably communicating said sources, preferably independently, with the top surface of said table.

4. A delivery support as claimed in claim 2, and in connection therewith vertical walls to be removably placed on said conveyor belt to form with said belt as bottom a mould for casting and rising a slab of aerated concrete.

5. A receiving support for the plant claimed in claim 1 in which said jack member comprises hydraulic, actuating means.

6. A receiving support for the plant claimed in claim 1 in which said jack member is arranged so as in the carrying position of its related carrying section to permit slight horizontal resiliency of said section.

7. A receiving support for the plant claimed in claim 1, comprising a rigid carriage which includes a carrying beam at each longitudinal half of the receiving support and is movable longitudinally along the assembly of said jack members, each of said beams, when advanced to a position below said carrying sections raised to their carrying positions, being adapted to engage the overlying portions of all of said sections, and means for vertical displacement of said beams relative to said sections so as to bring said beams to carry the assembly of sections, at least when said jack members are inactivated.

8. A receiving support as claimed in claim 7, comprising a track for said carriage arranged longitudinally of the assembly of jack members and extending further outside of said assembly in the transfer direction of the blocks, a set of rollers cooperating with said carriage and track to facilitate the movement of the carriage along said track.

9. A carrier as claimed in claim 1, comprising two substantially vertical side walls, at least one yoke member rigidly connecting the upper edges of said walls to form a rigid carrier structure, longitudinal horizontal strips on the inner sides of said walls near the lower edges of the walls and at an intermediate level of said carrier structure adapted to carry a support member consisting of a plurality of parallel transversal carrying sections, and on the outer side of each of said walls a rolling transport member close to the wall.

10. A carrier as claimed in claim 9, in which said rolling transport member comprises a bar rigidly secured to the wall cooperating with rollers fitted in said heating device, some of which rollers being, if desired, driven.

11. A carrier as claimed in claim 9, in which said rolling transport member comprises a bar rigidly secured to the wall and rollers rotatably mounted on said bar and adapted to cooperate with tracks in said heating device.

12. A carrier as claimed in claim 9, in which at least one, preferably two distant ones, of said yoke members is provided with a suspending member adapted to engage a lifting and/or a overhead crane mechanism.

13. A plant for manufacture of blocks, such as building elements, of aerated concrete, comprising a mould for casting and aerating a slab of set unhardened concrete, said mould having a bottom and substantially vertical walls removable from said bottom, a delivery support, a receiving support and a cutting member between said supports, means for transferring the slab cast and set in said mould from said delivery support onto said receiving support under relative motion between the slab and said cutting member, so that the receiving support receives longitudinally subdivided blocks, an autoclave for curing said blocks, and carrying means for transporting said blocks from said receiving support into said autoclave, said carrying means comprising a set of a plurality of separate carrying sections arranged in mutually parallel relationship and transversely to the direction of transfer of said slab and blocks and arranged in said receiving support to receive said subdivided blocks, a jack member for each carrying section for vertically moving the section, a carriage arranged to take and carry away said set of sections from the receiving support, and means for carrying said set of sections into said autoclave, said subdivided blocks being thus carried by said set of carrying sections through the entire plant.

References Cited

UNITED STATES PATENTS

| | | |
|---|---|---|
| 1,304,185 | 5/1919 | Jordan. |
| 1,771,414 | 7/1930 | McKenzie. |
| 1,880,872 | 10/1932 | Denton. |
| 2,912,738 | 11/1959 | Bergling et al. _____ 25—2 |
| 3,032,850 | 5/1962 | Russell _____ 25—2 |
| 3,250,835 | 5/1966 | Kozlov _____ 25—99 XR |

WILLIAM J. STEPHENSON, *Primary Examiner.*